DONALD M. HARVEY
INVENTOR.

BY Daniel E. Scragin
Robert W. Hampton
ATTORNEYS

United States Patent Office 3,479,935
Patented Nov. 25, 1969

3,479,935
AUTOMATIC SHUTTER CONTROL
Donald M. Harvey, Rochester, N.Y., assignor to Eastman Kodak Company, Rochester, N.Y., a corporation of New Jersey
Continuation of application Ser. No. 590,893, Oct. 31, 1966. This application Feb. 10, 1969, Ser. No. 815,510
Int. Cl. G01j 1/52
U.S. Cl. 95—10                            3 Claims

ABSTRACT OF THE DISCLOSURE

Magnetic breakaway shutters in which either the moment of breakaway is regulated, or the speed of the breakaway is regulated. An electromagnet is controlled by a photocell circuit to regulate the effect of the electromagnet which determines the speed of the shutter.

---

This is a continuation of application Ser. No. 590,893, filed Oct. 31, 1966, and now abandoned.

This invention relates to an exposure control for a camera and more particularly to an automatic shutter control.

Various systems have been proposed to automatically regulate shutter speed. These systems are complicated and bulky and are thus expensive to manufacture. It is therefore an object of the present invention to provide a simple, inexpensive shutter control. It is a further object of the invention to regulate the shutter speed of the camera using an electromagnet. Another object of the invention is to use a CdS photocell to regulate the current to an electromagnet which in turn regulates the time the shutter is open.

These and other objects of the present invention are accomplished by providing a battery in circuit with the CdS photocell connected to an electromagnet. The moment of current through the magnet determines the amount of force with which the magnet holds the shutter. The more force holding the shutter, the longer it will stay open. The photocell is connected so that as the ambient light is increased the time of exposure gets shorter.

The invention will be better understood by reference to the accompanying drawings wherein.

Figure 1:
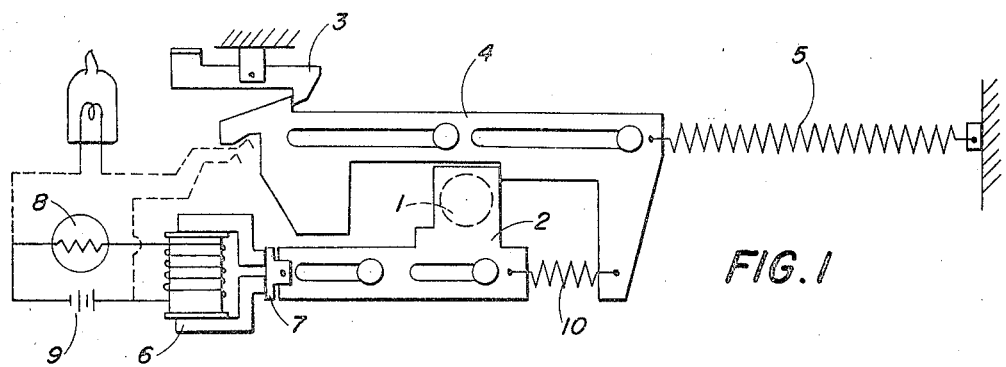
FIGS. 1–4 show an embodiment of the invention using the two-blade shutter in various stages of operation.

Referring to the drawings in which corresponding parts have been identified with the same numbers and referring in particularly to FIGS. 1–4 there is shown a camera aperture 1 which is covered by shutter member or blade 2. Shutter member 2 is held in its rest position by electromagnet 6 which magnetically attracts bar 7, said bar being affixed to shutter member 2 in any known manner. Coupled to shutter blade 2 through a spring 10 is a second shutter blade 4 which is biased to the right (as shown in FIGS. 1–4) by biasing means 5.

Figure 2:
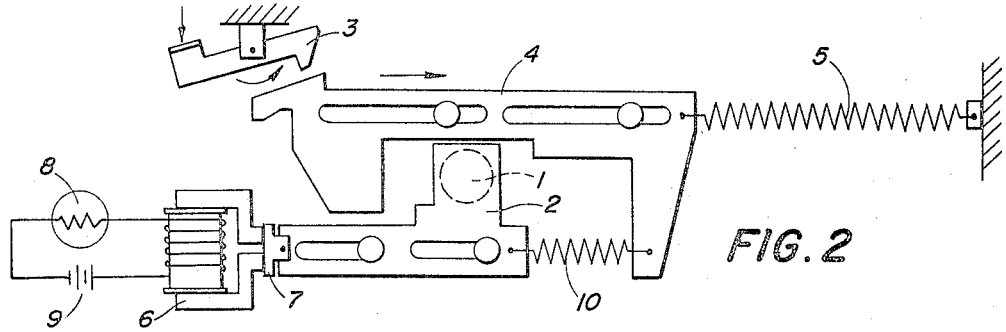
Figure 3:
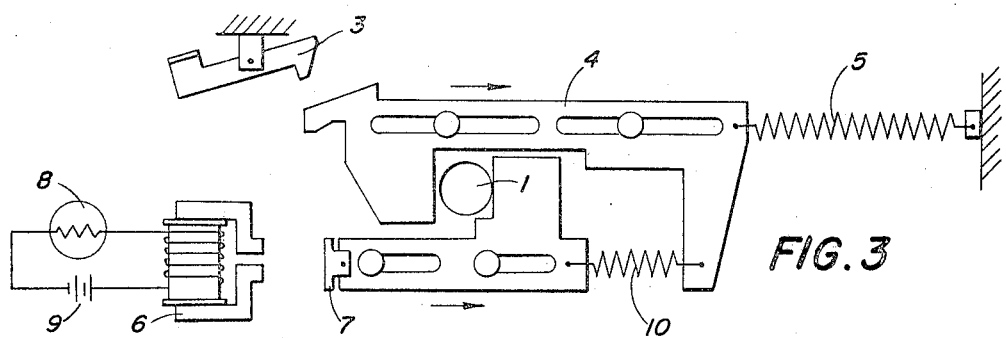
Figure 4:
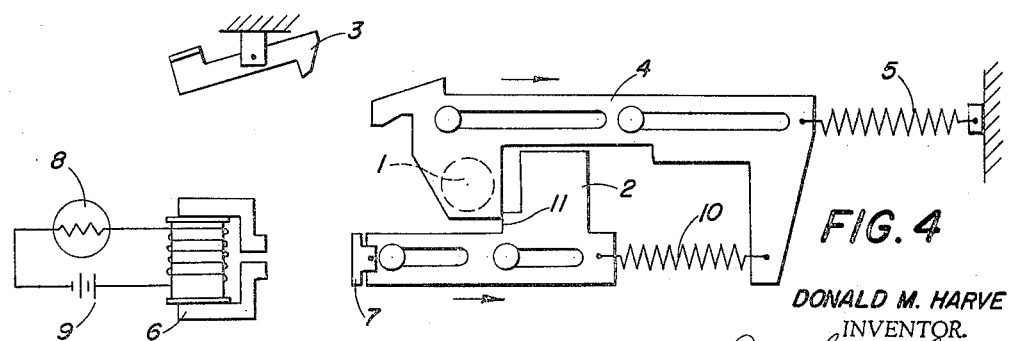

In operation, shutter release 3 is depressed. This releases shutter blade 4 as shown in FIG. 2 which moves to the right under the influence of biasing means 5 thereby tensioning spring member 10 and tending to pull shutter blade 2 to a position uncovering the aperture 1. Magnet 6 holds onto bar 7 with a force depending on the current going through the windings thereof. This current is controlled by the amount of light falling on photoconductive cell 8 in the usual manner. As shutter blade member 4 moves to the right, spring 10 exerts more pressure on shutter blade 2. When the tension of spring 10 exceeds the force with which the magnet is holding bar 7, shutter blade 2 moves to the right uncovering the aperture. Shutter blade 4 then continues to move to the right until it reaches its rest position where it is covering aperture 1 as shown in FIG. 4. When it is desired to take another picture, the shutter may be reset by moving the two shutter blades to their extreme left by any desired mechanism and reengaging release 3 and blade 4 as shown in FIG. 1. If it is desired, a switch may be included in the shutter mechanism to trigger a flashlamp as shown in FIG. 1 in dotted lines.

When there is so much light that photoconductive cell 8 is nearly a dead short, there is so much current flow through solenoid 6 that holding bar 7 will not release. In order for there to be at least a minimum exposure, shutter blade 2 is constructed with a shoulder. If shutter blade 4 has traveled to a point almost at the exposure aperture without shutter blade 2 being released from magnet 6, shutter blade 4 will hit the shoulder of shutter blade 2, thus dislodging it from magnet 6, and providing a slit traveling across exposure aperture 1 to give a short exposure.

Figure 5:
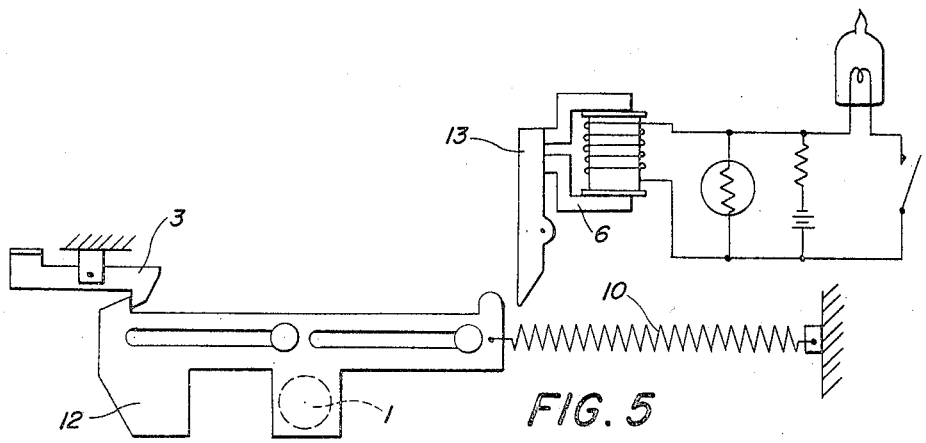
FIGS. 5–7 show an embodiment using a single-blade shutter in various stages of operation.
Figure 6:
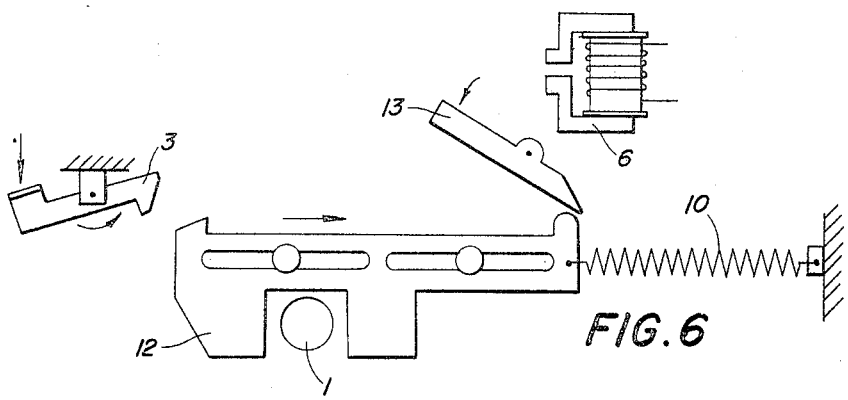
Figure 7:
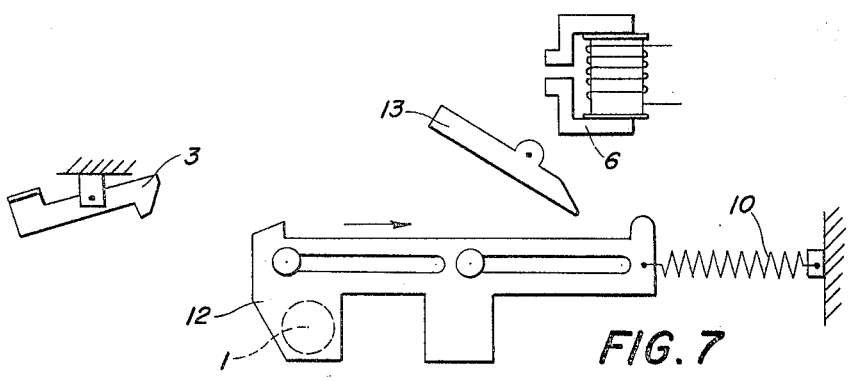

FIGS. 5–7 show an embodiment of the invention using a single element shutter. FIG. 5 shows the shutter in its rest position. Here shutter release 3 holds shutter blade member 12 to the left against the force of spring 10. Shutter blade 12 at this point covers aperture 1. As shown in FIG. 6, when the shutter release is actuated, shutter blade 12 moves to the right and hits magnetic member 13 which is pivoted and which is normally held in the position shown in FIG. 5 by magnet 6. The energy needed to pull member 13 away from magnet 6 is determined by the energization of magnet 6. The more current traveling through magnet 6, the more energy will be needed to pull member 13 away from the magnet. As shown in FIG. 6, as the shutter blade tends to travel to the right, it hits member 13 tending to pull it away from the magnet. The more force needed to hold member 13 away from the magnet the more the shutter blade will be slowed down. The more the shutter blade is slowed down, the longer the exposure will be. As shown in FIG. 7 when the shutter has moved all the way to the right, aperture 1 is completely covered. As in the previous embodiment the energization of the electromagnet is regulated by the photocell. In this embodiment also, contacts may be provided to synchronize the flashlamp.

Figure 8:
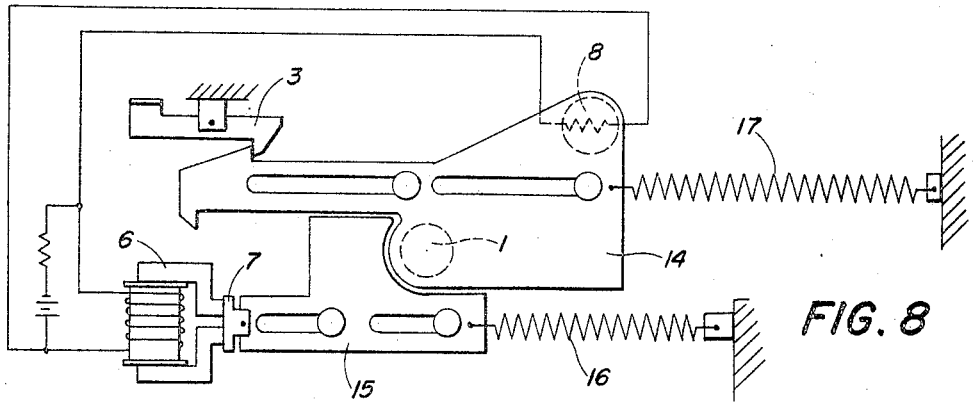
FIGS. 8–10 show an alternative form of a two-blade shutter in various stages of operation in which the photocell is exposured only during exposure of the film in the camera.
Figure 9:
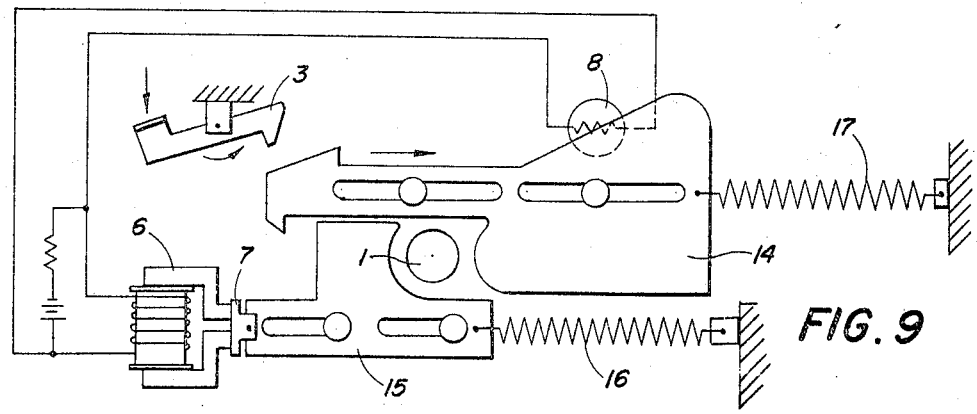
Figure 10:
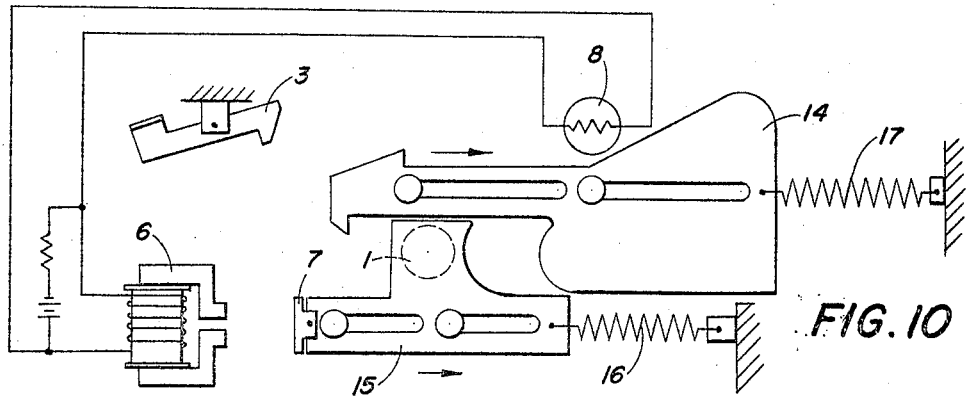

FIGS. 8–10 show another embodiment of the invention. In this embodiment two shutter blades are used. FIG. 8 shows the shutter in its rest position. Blade 14 covers photocell 8 while blade 15 is held by magnet 6 as in the previous embodiments. When shutter release 3 is actuated, blade 14 moves to the right under the force of spring 17 and uncovers photocell 8 in a gradual manner determined by the curve along the top of blade 14. When blade 14 has moved to the right enough so that a predetermined amount of light falls on cell 8, magnet 6 is deenergized, thus releasing bar 7 and permitting blade 15 to move to the right and cover aperture 1. This operation is shown in FIGS. 9 and 10. Before the next picture is to be taken, the shutter is reset back to the position shown in FIG. 8.

This invention has been described in detail with particular reference to the preferred embodiments thereof, but it will be understood that variations and modifications can be effected within the spirit and the scope of the invention and as described hereinbefore and as defined in the appended claims.

I claim:

1. In a camera having means defining an aperture through which a photosensitive medium is adapted to be exposed, the combination comprising:

(a) a shutter including a member movable to selectively cover and uncover said aperture during an exposure interval;
(b) an electromagnet for controlling the rate of movement of said movable member in response to current flow through said electromagnet;
(c) a pivoted member adapted to be positioned by said electromagnet and cooperative with said movable member to controllably slow the rate of said movable member in response to a variation in the magnitude of current flow through said electromagnet;
(d) a photocell;
(e) a source of current;
(f) circuit means connecting said electromagnet, photocell, and source for producing a current flow through said electromagnet related in magnitude to the amount of light impinging upon said photocell; and
(g) means for maintaining said current flow substantially constant during the exposure interval.

2. In a camera having means defining an aperture through which a photosensitive medium is adapted to be exposed to scene illumination during an exposure interval, the combination comprising:
(a) a shutter comprising a pair of movable members, each of said movable members being adapted to cover said aperture in sequence, said members being provided with means which prevent both of said members from sequentially covering said aperture without exposing the photosensitive medium to scene illumination;
(b) an electromagnet, one of said movable members being controlled by said electromagnet, the current through said electromagnet being controlled in response to scene illumination, said electromagnet being connected so as to pass a substantially constant current during said exposure interval; and
(c) means responsive to scene illumination for passing a substantially constant current through said electromagnet throughout the entire exposure interval.

3. In a camera having means defining an aperture through which a photosensitive medium is adapted to be exposed, the combination comprising:
(a) a shutter comprising at least first and second movable members adapted to sequentially uncover and cover said exposure aperture during an exposure interval;
(b) an electromagnet for controlling the movement of said first movable member;
(c) a photocell coverable by said second movable member;
(d) a source of current;
(e) circuit means connecting said electromagnet, photocell, and source for passing a current through said electromagnet related in magnitude to the amount of light impinging upon said photocell; and
(f) means for moving said second movable member from a photocell covering position to a photocell uncovering position when exposure is initiated to increasingly expose said photocell to scene illumination during the exposure interval.

References Cited

UNITED STATES PATENTS 3,205,797 9/1965 Land.
3,241,471 3/1966 Burgarella.

FOREIGN PATENTS 1,033,214 7/1953 France.
1,178,296 9/1964 Germany.
10,552 1966 Japan.

NORTON ANSHER, Primary Examiner

J. F. PETERS, JR., Assistant Examiner

U.S. Cl. X.R.

95—53